United States Patent
Robison et al.

(10) Patent No.: US 11,574,391 B2
(45) Date of Patent: Feb. 7, 2023

(54) MEDIAN BASED FREQUENCY SEPARATION LOCAL AREA CONTRAST ENHANCEMENT

(71) Applicant: BAE Systems Information and Electronic Systems Integration Inc., Nashua, NH (US)

(72) Inventors: Derek T. Robison, Acton, MA (US); Robin L. Brown, Leominster, MA (US); Jason V. Irr, Tewksbury, MA (US); Gregory W. Sletterink, Cambridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 71 days.

(21) Appl. No.: 17/349,346

(22) Filed: Jun. 16, 2021

(65) Prior Publication Data

US 2021/0312600 A1     Oct. 7, 2021

Related U.S. Application Data

(62) Division of application No. 16/391,783, filed on Apr. 23, 2019, now Pat. No. 11,049,226.

(51) Int. Cl.
| | |
|---|---|
| *G06T 5/00* | (2006.01) |
| *G06T 3/40* | (2006.01) |
| *G06T 5/40* | (2006.01) |
| *G06T 5/50* | (2006.01) |

(52) U.S. Cl.
CPC ............. *G06T 5/009* (2013.01); *G06T 3/40* (2013.01); *G06T 5/40* (2013.01); *G06T 5/50* (2013.01); *G06T 2207/10048* (2013.01); *G06T 2207/20024* (2013.01); *G06T 2207/20224* (2013.01)

(58) Field of Classification Search
CPC .. G06T 5/009; G06T 3/40; G06T 5/10; G06T 5/50
See application file for complete search history.

(56) References Cited

U.S. PATENT DOCUMENTS

| | | | | |
|---|---|---|---|---|
| 6,252,931 | B1* | 6/2001 | Aach | G06T 5/004 378/98.2 |
| 2003/0161549 | A1* | 8/2003 | Lei | G06T 5/009 382/250 |
| 2009/0175535 | A1* | 7/2009 | Mattox | G06T 5/007 382/164 |
| 2014/0355904 | A1* | 12/2014 | Olsson | G06T 5/003 382/263 |
| 2015/0288941 | A1* | 10/2015 | Schachter | G06T 5/50 348/164 |

(Continued)

*Primary Examiner* — Kevin Ky
(74) *Attorney, Agent, or Firm* — Scott J. Asmus; Maine Cernota & Rardin

(57) ABSTRACT

Local detail enhancement (LDE) is an imagery contrast enhancement method applied to visible and uncooled long wave imagery. It enhances local spatial detail through the use of a median based high/band pass filter. The generated detail channel is blended with a histogram-equalized version of the image, creating an image that contains both local detail as well as retaining some amount of global intensity. Retaining global intensity coherency allows for easier target acquisition when compared to fully local forms of contrast enhancement.

20 Claims, 7 Drawing Sheets

(56) References Cited

U.S. PATENT DOCUMENTS

| | | | |
|---|---|---|---|
| 2015/0358560 A1* | 12/2015 | Boulanger | H04N 5/332 348/164 |
| 2016/0156858 A1* | 6/2016 | Lee | H04N 5/3656 348/241 |
| 2016/0323525 A1* | 11/2016 | Lee | H04N 5/378 |
| 2017/0374304 A1* | 12/2017 | Williams | H04N 5/365 |
| 2018/0276803 A1* | 9/2018 | Lee | G06T 5/009 |
| 2018/0315171 A1* | 11/2018 | Lee | H04N 5/361 |
| 2019/0130208 A1* | 5/2019 | Michael | G06V 10/20 |
| 2020/0029059 A1* | 1/2020 | Chahine | H04N 5/33 |
| 2021/0312600 A1* | 10/2021 | Robison | G06T 5/004 |

* cited by examiner

PRIOR ART IMAGING SYSTEM

HIGH LEVEL FLOW CHART

210 EMBODIMENT FOR GENERATING THE SPATIAL LOW PASS VERSION OF THE INITIAL INPUT IMAGE

DETAIL FLOW CHART

SPATIAL HIGH PASS IMAGE STEPS EMBODIMENT

DETAIL FLOW CHART

FLOW CHART SECOND EMBODIMENT

MEDIAN KERNEL

700

705 UNPROCESSED "BEFORE" IMAGE

710 PROCESSED "AFTER" IMAGE
BEFORE AND AFTER

MEDIAN BASED FREQUENCY SEPARATION LOCAL AREA CONTRAST ENHANCEMENT

FIELD OF THE DISCLOSURE

This disclosure relates to enhancing local contrast in images, more particularly, in infrared images in low Size, Weight, And Power (SWAP) systems, creating a globally coherent image without causing halo image artifacts or washing out regions of high dynamic range images.

BACKGROUND

Imaging systems, especially infrared imaging systems, exhibit image quality tradeoffs between local contrast and image distortion. Enhancing local contrast in infrared images in low SWAP systems results in halo image artifacts. Fully local forms of contrast enhancement cannot provide both local detail and retain global intensity. This impairs target acquisition.

FIG. 1 depicts a prior art sensor system 100 for producing an image from an infrared sensor. Depicted are a scene 105; digital imager 110 obtaining an image of scene 105; and digital imaging components 115 for processing the image of scene 105 taken by digital imager 110. Included in components 115 is digital imager infrared sensor array 120. Digital imager sensor array 120 comprises pixels sensing infrared radiation. Output 125 is derived from the pixels.

What is needed is a device, system, and method to provide a globally coherent image, retaining global intensity coherency, while enhancing local contrast without creating halo artifacts or washing out regions of the image.

SUMMARY

An embodiment provides a system for local detail image enhancement (LDE) comprising an LDE processing module comprising one or more processors for receiving an initial input image; generating a spatial low pass version of the initial input image; subtracting the spatial low pass image from the initial input image to form a spatial high pass image; multiplying the spatial high pass image by a factor; and combining the spatial high pass image with a histogram-equalized version of the initial input image; and outputting an LDE image; whereby local detail contrast is enhanced and global intensity coherency is retained without creating halo artifacts or washing out regions of the initial input image. Further embodiments comprise scaling the spatial high pass image based on a response of the system, to form a scaled high pass image; and offsetting the scaled, high pass image result. In other embodiments the initial input image is a non-uniformity corrected (NUC) long wave infrared image. Subsequent embodiments comprise an FPGA and an uncooled infrared imager. For additional embodiments, the step of generating the spatial low pass version of the initial input image comprises downsampling by a factor of at least 2; filtering with a median kernel; and upsampling back to an uncooled infrared imager prior to calculating the spatial high pass image. In another embodiment, a shaping function is implemented as a lookup table that both scales data and caps it at 9 bits or fewer. For a following embodiment, multi-bit data is combined with an upper 9-bits of an output of a plateau equalization module. In subsequent embodiments a non-uniformity corrected infrared initial input image is passed through a median filter to create an edge-preserved low pass version of the initial input image. In additional embodiments a non-uniformity corrected infrared initial input image is passed through a 9×9 median filter to create an edge-preserved low pass version of the image; and subtracting the edge-preserved low pass version of the initial input image from the initial input image to create the spatial high pass image.

Another embodiment provides a method for system for local detail image enhancement (LDE) comprising receiving a non-uniformity corrected (NUC) infrared image; passing the NUC infrared image through a median filter to create an edge-preserved low pass version of the NUC infrared image; subtracting the edge-preserved low pass version of the NUC infrared image from the NUC infrared image to create a high pass image; applying a median filter to the high pass image to create a band pass image; shaping the band pass image using a shaping function to create a shaped image; normalizing the shaped image through a linear stretch; processing the NUC infrared image through a contrast limited histogram equalization, producing a globally equalized image; combining the band pass image and the globally equalized image, comprising a user adjustable weighting function; and outputting an LDE image; whereby local detail contrast is enhanced, and global intensity coherency is retained without creating halo artifacts or washing out regions of the initial input image. In included embodiments the step of passing the NUC infrared image through a median filter comprises an N×N median filter, where N is approximately a horizontal number of pixels divided by 64. In yet further embodiments the step of passing the NUC infrared image through a median filter comprises a median filter to create the edge-preserved low pass version of the NUC infrared image. In related embodiments the step of applying a median filter to the high pass image comprises a median filter to suppress high frequency noise. For further embodiments the step of shaping the band pass image comprises shaping the band pass image using a shaping function that is approximately $y=x^{(1/1.25)}$. In ensuing embodiments the step of normalizing the shaped image through a linear stretch comprises ignoring a fixed number of pixels at a top and a bottom of a histogram and observing a maximum stretch to minimize noise. For yet further embodiments, the step of combining the band pass image and the globally equalized image comprises a user adjustable weighting function. For more embodiments, the NUC input image is downsampled, filtered, then upsampled back to an initial resolution. Continued embodiments include that the spatial high pass image is scaled based on a response of a system using a non-linear shaping function. For additional embodiments, the spatial high pass image is scaled based on a response of a system using a non-linear shaping function implemented as a lookup table.

A yet further embodiment provides a computer program product including one or more non-transitory machine-readable mediums encoding instructions that when executed by one or more processors cause a process to be carried out for enhancing local contrast for an imager, the process comprising receiving an initial input image; generating a spatial low pass version of the initial input image; subtracting the spatial low pass image from the initial input image to form a spatial high pass image; scaling the spatial high pass image based on a response of a system, to form a scaled high pass image; offsetting the signed, scaled, high pass image result; multiplying the offset signed, scaled, high pass image by a factor; and combining the offset, signed, scaled, high pass image with a histogram-equalized version of the initial input image; whereby local detail contrast is enhanced and global intensity coherency is retained without creating halo artifacts or washing out regions of the initial input image.

Figure 1:
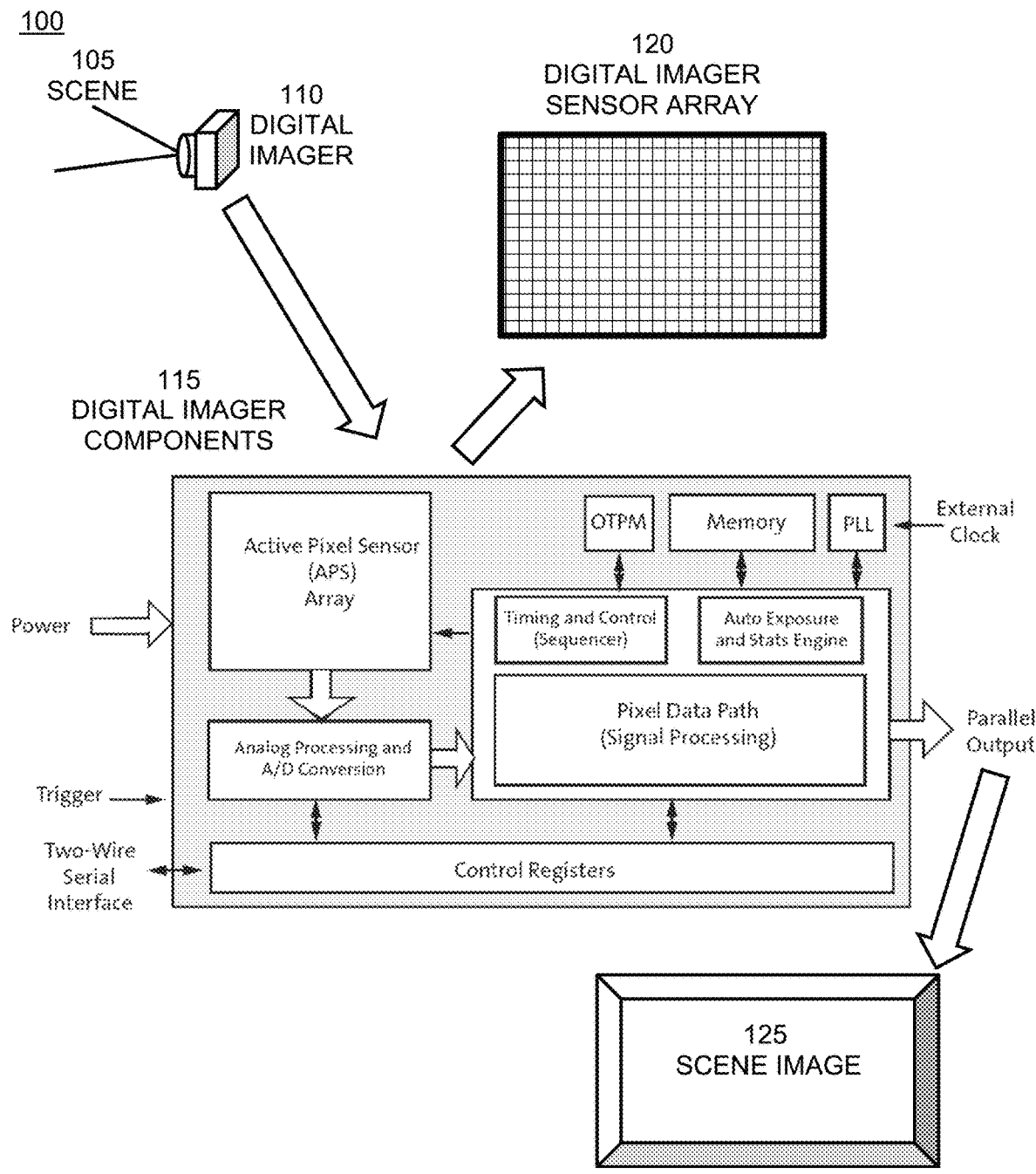
FIG. 1 depicts a prior art sensor system.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments generally provide contrast enhancement of high dynamic range images. Embodiments provide image processing for commercial visible (ASD) cameras as well as LWIR cameras. Embodiments provide an alternative to other forms of Local Adaptive Contrast Enhancement (LACE) cameras. In contrast to disclosed embodiments, the LACE algorithms have larger resource footprints, and affect the entire frame. LACE algorithms lose context across the entire frame, as they are completely local.

Local detail enhancement (LDE) is an imagery contrast enhancement method. Embodiments are targeted at uncooled long wave imagery. Embodiments enhance local spatial detail through the use of a median based high/band pass filter. The generated detail channel is blended with a histogram-equalized version of the image, creating an image that contains both local detail as well as retaining some amount of global intensity. Retaining global intensity coherency allows for easier target acquisition when compared to fully local forms of contrast enhancement. Histogram-equalization is a contrast adjustment method that uses the image's histogram. In embodiments, the LDE image output comprises output to a display, or as an input for storage or further processing. Global (across the entire image, rather than local) intensity coherency is a statistic for examining the relation between signals' intensities. Halo (ringing) artifacts are observed when an output signal oscillates at a fading rate around a sharp transition in the input; it is a problem where dark regions near edges remain dark after image enhancement. Washing out is an image characteristic in which colors are low in saturation and/or contrast or tones are low in contrast and too light in density. A shaping or filtering function can produce an output with a smoother form. Plateau (histogram) equalization is a technique for contrast enhancement of images where the pixels (pels) count is limited to an inception value defined based on histogram properties. Edge-preserved smoothing smooths away noise or textures while retaining sharp edges; examples comprise median, bilateral, guided, and anisotropic diffusion filters. Linear stretch is an image enhancement technique that attempts to improve an image by 'stretching' the range of values it contains to span a desired range of values, e.g. the full range of pixel values that the image type concerned allows. Contrast limited histogram equalization is used to improve contrast in images; over amplification of noise in relatively homogeneous regions of an image is prevented by limiting the amplification. A globally equalized image refers to a method of contrast adjustment using the image's histogram that can increase the global contrast of images, especially when the usable data of the image is represented by close contrast values. A user adjustable weighting function applies different weights for sub-histograms.

A spatial low pass version of the input image is generated by filtering the image with a median filter N×N size where N is approximately the horizontal number of pixels divided by 64. If needed for implementation the image can be downsampled, filtered, then upsampled back to initial resolution. This low pass image is then subtracted from the initial image to form a spatial high pass. The spatial high pass is scaled based on the response of the system using an optionally non-linear shaping function. The shaped high pass is then optionally filtered through a 3×3 median filter to remove high frequency noise creating a spatial band pass image. The signed result is offset such that 0 is represented by mid-scale of the desired output bit depth. The video is then multiplied by a user controlled scale factor and combined with a histogram equalized version of the input data multiplied by 1 minus the scale factor.

At least one example implementation in FPGA is targeted at a 640×480 uncooled infrared imager. When generating the low pass, the input image is downsampled by a factor of 2, and filtered with a 5×5 median kernel. The result is upsampled back to 640×480 prior to calculating the high pass. In embodiments, the shaping function is implemented as a lookup table that both scales the data and caps it at 9 bits. The 9 bit data is combined with the upper 9 bits of the output of the plateau equalization module.

Figure 2:
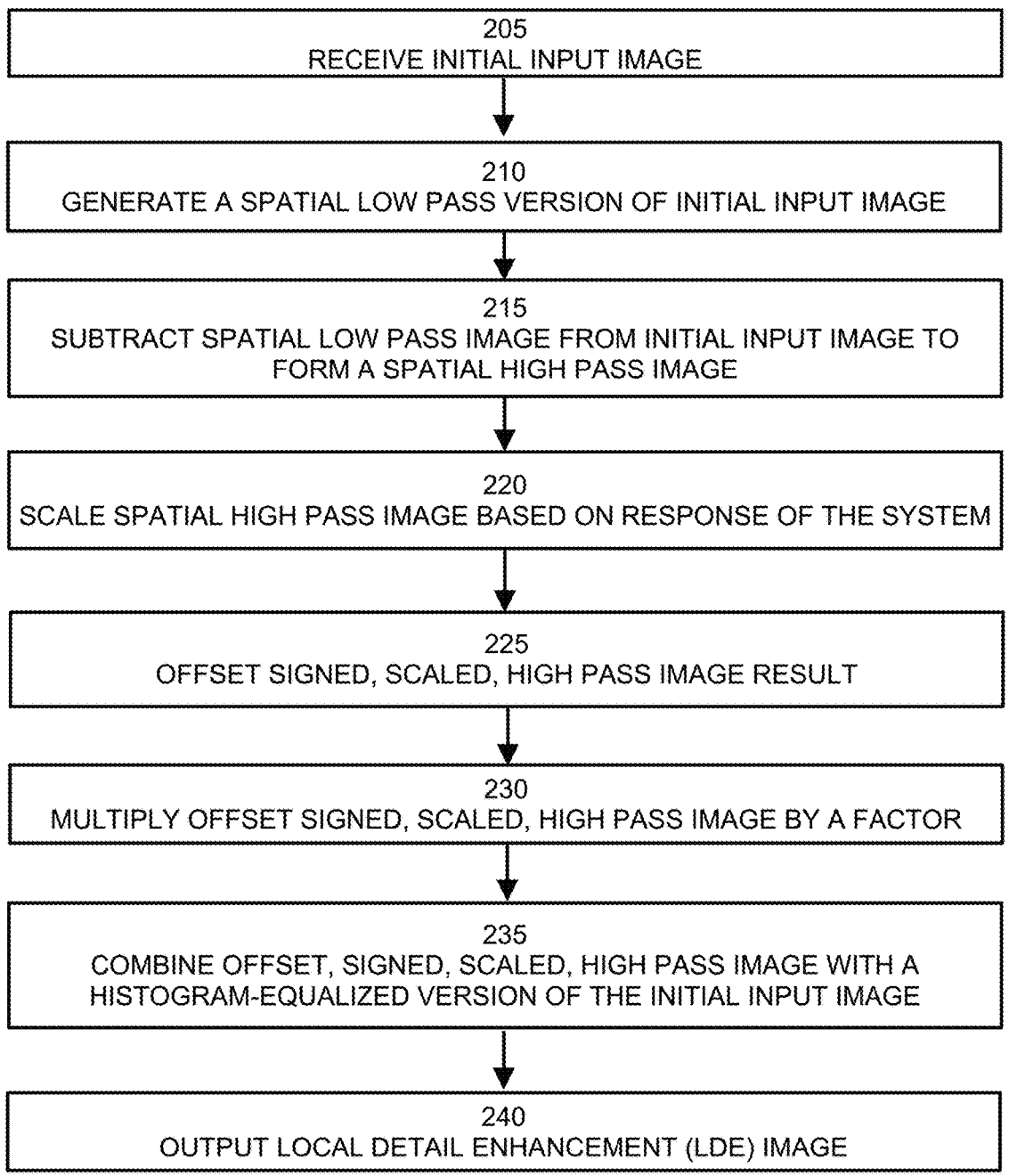
FIG. 2 depicts a high level flow chart for a method configured in accordance with an embodiment.

FIG. 2 is a high level flow chart for an embodiment 200 for enhancing local contrast in images. Steps comprise: receiving an initial input image 205; generating a spatial low pass version of the initial input image 210; subtracting the spatial low pass image from the initial input image to form a spatial high pass image 215; scaling the spatial high pass image based on a response of the system, to form a scaled high pass image 220; offsetting the signed, scaled, high pass image result 225; multiplying the offset signed, scaled, high pass image by a factor 230; and combining the offset, signed, scaled, high pass image with a histogram-equalized version of the initial input image 235; and outputting a Local Detail enhancement (LDE) image 240. Local detail contrast is enhanced, and global intensity coherency is retained without creating halo artifacts or washing out regions of the initial input image.

Figure 3:
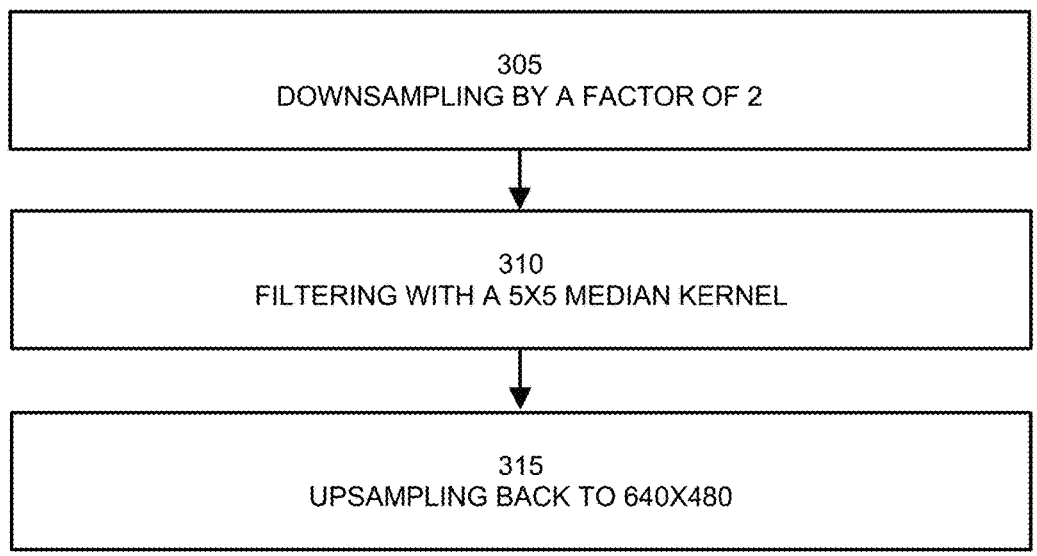
FIG. 3 is a detail flow chart for generating the spatial low pass version of the initial input image configured in accordance with an embodiment.

FIG. 3 is a detail flow chart 300 for step 210, generating the spatial low pass version of the initial input image. In embodiments with a 640×480 pixel imager and 2× downsample, steps comprise: downsampling by a factor of 2 305; filtering with a 5×5 median kernel 310; and upsampling back to 640×480 315 prior to calculating said spatial high pass image.

Figure 4:
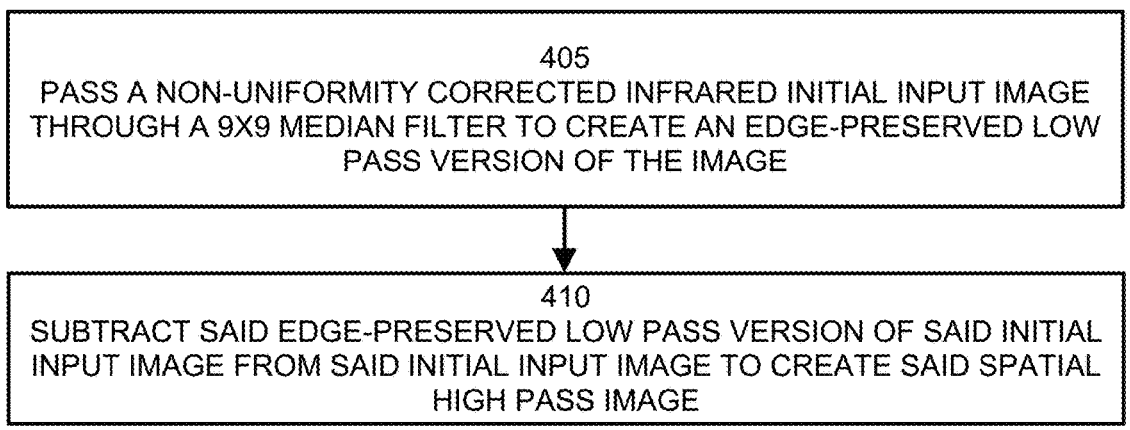
FIG. 4 is a detail flow chart for a method for spatial high pass image steps configured in accordance with an embodiment.

FIG. 4 is a detail flow chart 400 for spatial high pass image steps. In embodiments with a 640×480 pixel imager and no downsampling, steps comprise: passing a non-uniformity corrected infrared initial input image through a 9×9 median filter to create an edge-preserved low pass version of the image 405; and subtracting the edge-preserved low pass version of the initial input image from the initial input image to create the spatial high pass image 410.

Figure 5:
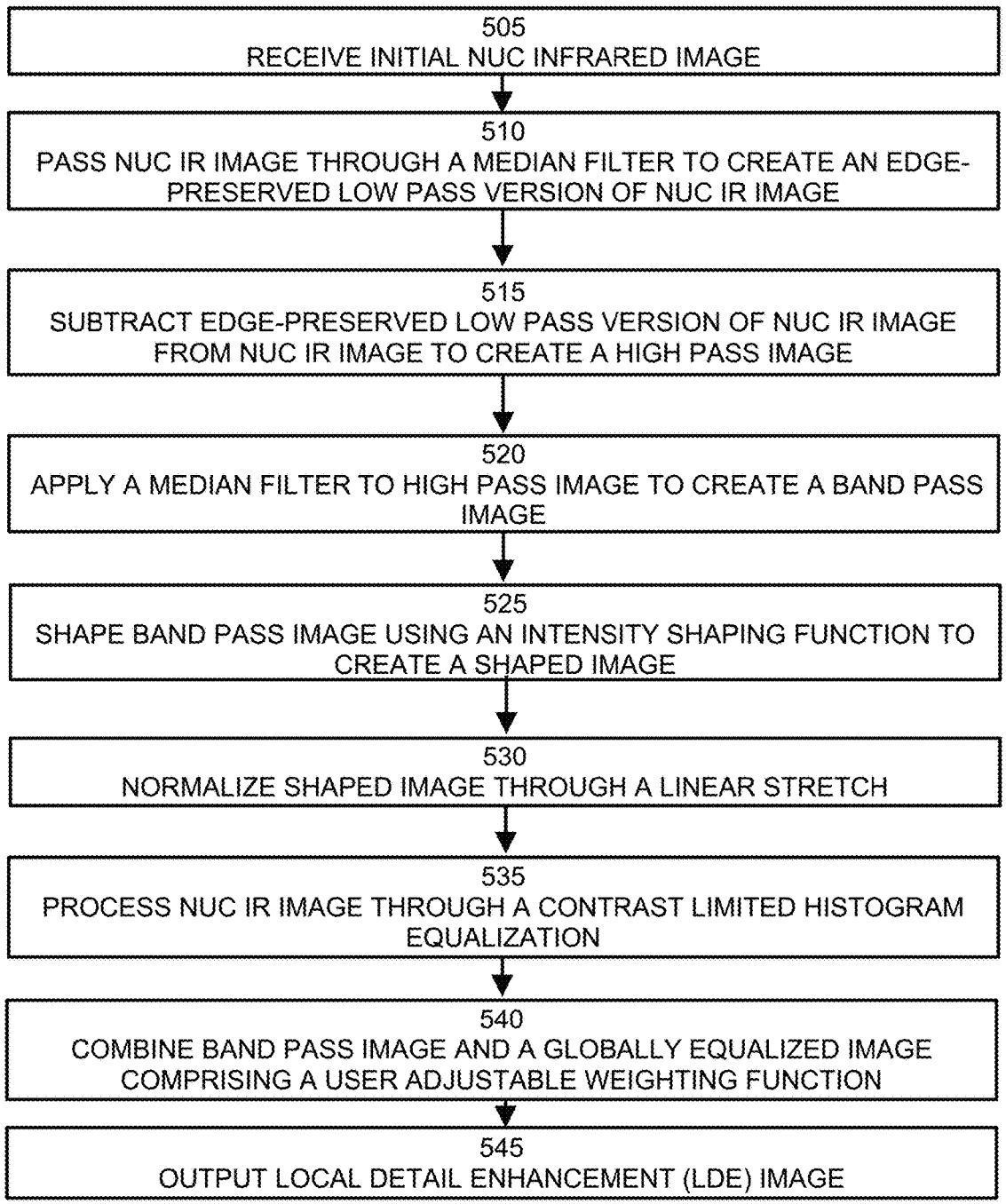
FIG. 5 is a flow chart for a method configured in accordance with another embodiment.

FIG. 5 is a high level flow chart for an embodiment 500. Steps comprise: receiving a non-uniformity corrected (NUC) infrared image 505; passing the NUC infrared image through a median filter to create an edge-preserved low pass version of the NUC infrared image 510; subtracting the edge-preserved low pass version of the NUC infrared image from the NUC infrared image to create a high pass image 515; applying a median filter to the high pass image to create a band pass image 520; shaping the band pass image using an intensity shaping function to create a shaped image 525; normalizing the shaped image through a linear stretch 530; processing the NUC infrared image through a contrast limited histogram equalization 535; combining the band pass image and a globally equalized image comprising a user adjustable weighting function 540; and outputting an LDE image 545.

Figure 6:
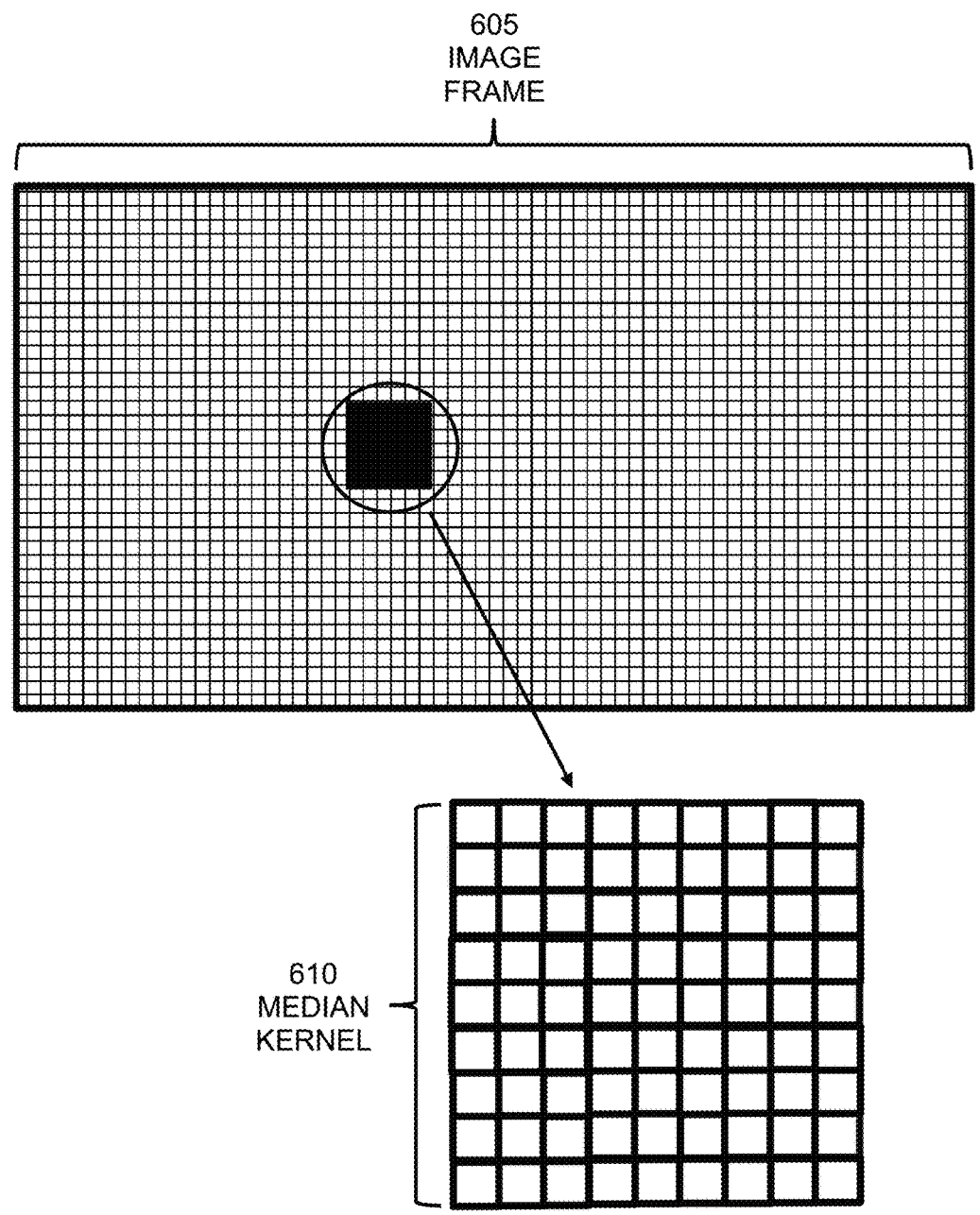
FIG. 6 depicts an image frame kernel configured in accordance with an embodiment.

FIG. 6 depicts a kernel for an image frame 600. Image frame 605 is processed by a median kernel 610. Embodiments comprise a median filter of N×N size where N is approximately the horizontal number of pixels divided by 64. Example 610 is 9×9 pixels for a 640×480 image.

Figure 7:
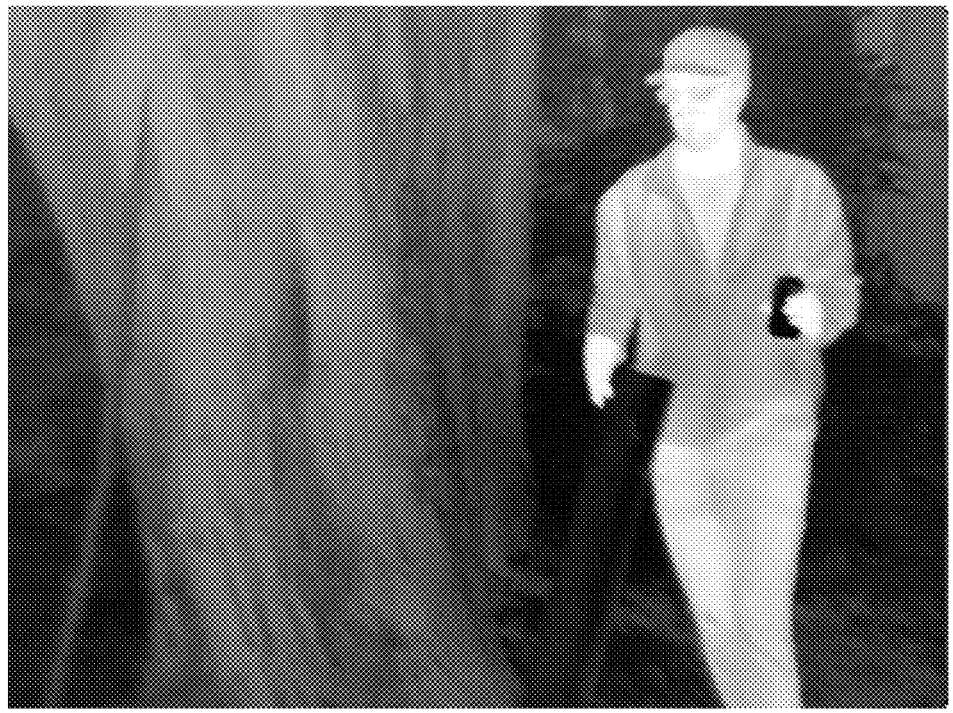
FIG. 7 depicts before and after display results configured in accordance with an embodiment.
Figure 7:

FIG. 7 depicts before 705 and after 710 display results for an embodiment. Processed image 710 is a globally coherent image with enhanced contrast, without halo image artifacts or washing out of regions of high dynamic range compared to unprocessed image 705.

The following partial MATLAB code listing provides operations for method steps for embodiments.

```
function [imOut]=laceDR(imIn, weight, plateau, numBins, medShape, medianSize, downsample, noiseSupress, stretch)
% laceDR Median based local area contrast enhancement
% Detailed explanation
sqrtKeepout=256;
% calculate plt eq of background
plt=clahe(imIn, 1, 1, plateau, numBins);
% downsample the image
imMedian=imresize(imIn, downsample);
% calculate median
imMedian=medfilt2(imMedian, [medianSize medianSize]);
% resample the output
imMedian=imresize(imMedian, 1/downsample);
% create high pass image
imMedian=imIn-imMedian;
% normalize high pass image to 8 bit
if(medShape~=1)
    % square root high pass shaping
    imMedian(imMedian<-sqrtKeepout)=-((-imMedian(imMedian<-sqrtKeepout)-sqrtKeepout).^(1/medShape))-sqrtKeepout;
    imMedian(imMedian>sqrtKeepout)=(imMedian(imMedian>sqrtKeepout)-sqrtKeepout).^(1/medShape)+sqrtKeepout;
end
% run second pass median filter
imMedian=medfilt2(imMedian, [noiseSupress noiseSupress]);
if(stretch==1)
    imMedian=imMedian-min(min(imMedian));
    imMedian=imStretch(imMedian);
else
    imMedian=imMedian/2+128;
    imMedian(imMedian<0)=0;
    imMedian(imMedian>255)=255;
end
% blend plateau image and high pass image
imOut=plt*(1-weight)+imMedian*weight;
imOut(imOut<0)=0;
imOut(imOut>255)=255;
end
```

The computing system used for the enhancement of local contrast in images for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for local detail image enhancement (LDE) comprising:
   receiving a non-uniformity corrected (NUC) infrared image;
   passing the NUC infrared image through a first median filter to create an edge-preserved low pass version of the NUC infrared image;
   subtracting the edge-preserved low pass version of the NUC infrared image from the NUC infrared image to create a high pass image;
   applying a second median filter to the high pass image to create a band pass image;
   shaping the band pass image using a shaping function to create a shaped band pass image;
   processing the NUC infrared image through a contrast limited histogram equalization, producing a globally equalized image;
   combining the shaped band pass image and the globally equalized image using an adjustable weighting function; and
   outputting a local detail image enhancement (LDE) image.

2. The method of claim 1, wherein the first median filter comprises:
   an N×N median filter, where N is a number of horizontal pixels divided by 64.

3. The method of claim 1, further comprising downsampling, filtering and upsampling of the edge-preserved low pass version of the NUC infrared image.

4. The method of claim 3, wherein the downsampling is by a factor of 2 and the filtering is with a 5×5 median filter.

5. The method of claim 1, wherein the second median filter suppresses high frequency noise.

6. The method of claim 1, wherein the shaping function is approximately $y=x^{(1/1.25)}$.

7. The method of claim 1, further comprising normalizing the shaped band pass image through a linear stretch.

8. The method of claim 7, wherein normalizing the shaped band pass image through the linear stretch comprises ignoring a fixed number of pixels at a top and a bottom of the histogram and observing a maximum stretch to minimize noise.

9. The method of claim 1, wherein the adjustable weighting function is a user adjustable weighting function.

10. The method of claim 1, wherein the high pass image is scaled using a non-linear shaping function.

11. The method of claim 10, wherein the non-linear shaping function is implemented as a lookup table.

12. The method of claim 1, wherein the local detail image enhancement (LDE) image comprises enhanced local detail contrast with global intensity coherency without creating halo artifacts or washing out regions of the initial input image.

13. A computer program product including one or more non-transitory machine-readable mediums encoding instructions that when executed by one or more processors cause a process to be carried out for enhancing local contrast for an imager, the process comprising:
   receiving a non-uniformity corrected (NUC) infrared image;
   passing the NUC infrared image through a first median filter to create an edge-preserved low pass version of the NUC infrared image;
   subtracting the edge-preserved low pass version of the NUC infrared image from the NUC infrared image to create a high pass image;
   applying a second median filter to the high pass image to create a band pass image;
   shaping the band pass image using a shaping function to create a shaped band pass image;
   processing the NUC infrared image through a contrast limited histogram equalization, producing a globally equalized image;
   combining the shaped band pass image and the globally equalized image using a weighting function; and
   outputting a local detail image enhancement (LDE) image.

14. The computer program product of claim 13, further comprising normalizing the shaped band pass image through a linear stretch.

15. The computer program product of claim 13, wherein the weighting function is a user adjustable weighting function.

16. The computer program product of claim 13, wherein the high pass image is scaled using a non-linear shaping function.

17. The computer program product of claim 13, wherein the local detail image enhancement (LDE) image comprises enhanced local detail contrast with global intensity coherency without creating halo artifacts or washing out regions of the initial input image.

18. The computer program product of claim 13, wherein the one or more non-transitory machine-readable medium encoding instructions are executed entirely on a user's computer.

19. The computer program product of claim 13, wherein the one or more non-transitory machine-readable medium encoding instructions are executed partly on a user's computer and partly on a remote computer.

20. The computer program product of claim 13, wherein the one or more non-transitory machine-readable medium encoding instructions are executed entirely on a remote computer.

* * * * *